United States Patent Office 3,625,651
Patented Dec. 7, 1971

3,625,651
METHOD FOR REMOVING SULFUR DIOXIDE FROM BORON TRIFLUORIDE
Joachim Massonne, Hannover, and Wilfried Becher, Anderten, Germany, assignors to Kali-Chemie Aktiengesellschaft, Hannover, Germany
No Drawing. Filed Feb. 24, 1969, Ser. No. 801,742
Claims priority, application Germany, Mar. 9, 1968,
P 16 67 582.4
Int. Cl. C01b 9/08
U.S. Cl. 23—205                    5 Claims

ABSTRACT OF THE DISCLOSURE

Sulfur dioxide is removed from boron trifluoride by contact at a temperature between 0° and −80° C. with granular activated carbon.

BACKGROUND OF THE INVENTION

Area of the invention

The present invention relates to boron trifluoride and more especially to the production of boron trifluoride by reaction of boric acid with hydrogen fluoride and subsequent purification of the boron trifluoride.

Prior art

In the production of boron trifluoride by reaction of boric acid with hydrogen fluoride making use of sulfur trioxide or compounds containing it as a water absorbing agent, the reaction product is frequently found to contain not only water vapor, sulfur trioxide, hydrogen fluoride or compounds of these substances, but also sulfur dioxide. The amount of these impurities depends upon the reaction temperatures and the type of reactor material. Since these impurities impair many reactions for which boron trifluoride is used as a reaction component or catalyst, a purification of the product as produced industrially is in most cases something which cannot be avoided.

As is known, boron trifluoride is chemically very reactive; removal of the impurities chemically is therefore not practicably possible. The removal of water vapor, hydrogen fluoride and sulfur trioxide can, however, be carried out using physical methods without difficulty. It is only the separation of sulfur dioxide which is not readily possible. Thus, for example sulfur dioxide cannot be removed completely by cooling to condense it owing to its finite partial pressure even at comparatively low temperatures.

One possibility for removing sulfur dioxide from boron trifluoride would be by distillation at low temperature; this method is, however, not economic since the low boiling point of −100° of $BF_3$ makes the use of very low temperatures necessary. Furthermore for the separation of sulfur dioxide by distillation under pressure very low temperatures would again be required owing to the low critical temperature of boron trifluoride so that this method as well would be uneconomic.

BROAD DESCRIPTION OF THE INVENTION

One object of the present invention is to provide a method for the separation of sulfur dioxide from boron trifluoride which is economically feasible.

The method of removing sulfur dioxide from boron trifluoride in accordance with the invention is characterised in that the impure gaseous boron trifluoride is contacting with granular activated carbon at a temperature between 0° and −80° C., preferably between −10° and −30° C. In the simplest case the boron trifluoride containing the sulfur dioxide is passed through a layer of granular activated carbon held at the required temperature. Sulfur dioxide is adsorbed quantitatively by the granular activated carbon and thus removed from the boron trifluoride. The ratio between the adsorbed quantity of sulfur dioxide and adsorbed boron trifluoride is especially favorable at temperatures below −10° C. so that major losses of boron trifluoride can be avoided. The boron trifluoride which is adsorbed on the granular activated carbon can, furthermore, easily be recovered if the $SO_2$ containing boron trifluoride mixture escaping on regeneration is contacting so as to produce a boron trifluoride addition compound, for example the phosphoric acid adduct.

A further advantage of the method in accordance with the invention is that impurities which are additionally present, such as water vapor, sulfur trioxide and hydrogen fluoride, which may be present in small quantities after customary scrubbing of the raw gases with concentrated sulfuric acid, are also removed completely. It is therefore not necessary to employ additional physical methods for removing such impurities.

Although granular activated carbon is known for absorbing gases and other materials, it is a surprising feature of the present invention that there is a selective separation of sulfur dioxide from boron trifluoride. Other adsorbing materials with high specific surface areas, f.i. silicate or kaolin containing materials, such as activated kaolin or molecular sieves, are completely unsuitable because at the temperature ranges available for operation a practically irreversible adsorption of the boron trifluoride occurs.

For carrying out the method the granular activated carbon is degassed by heating before use and freed of adsorbed moisture. The granular activated carbon bed is cooled to the desired temperature and the gas to be purified is passed through it. The arrival of sulfur dioxide in the output gas stream can be detected by an iodine-starch solution in which a sample of the emerging gas is dissolved. In order to regenerate the granular activated carbon the adsorbed gas can be displaced by heating. For this purpose heating to a temperature between 80° and 200° C. can take place. During the heating a gas which does not react with the granular activated carbon or materials adsorbed on it can be passed through the bed, for instance nitrogen or, also, boron trifluoride.

The boron trifluoride and sulfur dioxide evolved from the granular activated carbon on regeneration are separated by the formation of an adduct of boron trifluoride, e.g., an adduct of boron trifluoride with phosphoric acid.

DETAILED DESCRIPTION OF THE INVENTION

The invention is now illustrated by means of two examples.

EXAMPLE 1

Boron trifluoride containing 3.84% sulfur dioxide by volume was passed at a speed of about 5 l./h. at −25° C. over or through 7.3 g. of granulated activated carbon in a U-tube. The volume occupied by the granular activated carbon was 26 cubic centimeters and the length of the granular activated carbon layer was 18.3 centimeters, 62.9 g. of pure boron trifluoride were obtained before sulfur dioxide appeared in the emerging gas.

EXAMPLE 2

Two samples of boron trifluoride with volume percentage sulfur dioxide contents of 4.9 and 3.84 respectively were passed with the speed of about 5 l./h. at different temperatures between −25° and +23° C. through 7.3 g. of granulated active carbon in a U-tube. The time elapsing until $SO_2$ appeared in the emerging gas was measured together with the quantity of $SO_2$ adsorbed and the quantity of pure boron trifluoride obtained before $SO_2$ appeared in the emerging gas. The following table of results indicates that for industrial purposes a temperature below 0°

C. must be used to obtain sufficient sulfur dioxide adsorption.

TABLE

| Run number | 1 | 2 | 3 | 4 |
|---|---|---|---|---|
| $SO_2$ content of gas mixture (vol.-percent) | 4.9 | 4.9 | 3.84 | 3.84 |
| Temperature of adsorption layer (° C.) | +23 | +1 | −12.5 | −25 |
| Grams of adsorbed $SO_2$ | 0.10 | 0.28 | 1.85 | 2.30 |
| Time elapsing before appearance of $SO_2$ in emerging gas (minutes) | 20 | 45 | 215 | 253 |
| Grams of pure $BF_3$ obtained before appearance of $SO_2$ in emerging gas | 1.88 | 5.41 | 48.7 | 62.9 |

We claim:

1. A method of removing sulfur dioxide from a gaseous mixture of boron trifluoride which comprises: (a) passing said gaseous mixture through a layer of granular activated carbon at a temperature between 0° and −80° C., whereby said sulfur dioxide in said gaseous admixture is adsorbed on said granular activated carbon; and (b) recovering pure boron trifluoride.

2. A method as described in claim 1 wherein step (a) is carried out at a temperature between −10° and −30° C.

3. A method as described in claim 1 wherein said activated granular carbon is preliminarily heated at a reduced pressure to remove gases and moisture.

4. A method as described in claim 1 wherein, after said gaseous mixture has been passed through said granular activated carbon, said granular activated carbon is regenerated by heating said granular activated carbon at a temperature between 80° and 200° C., whereby the sulfur dioxide and traces of boron trifluoride adsorbed on said granular activated carbon evolve as a gaseous mixture.

5. A method as described in claim 4 wherein an inert sweep gas stream, which does not react with said granular activated carbon, with said sulfur dioxide and traces of boron trifluoride that are adsorbed on said granular activated carbon, is passed through the granular activated carbon during said regeneration.

References Cited

UNITED STATES PATENTS

| 2,167,358 | 7/1939 | Gleason | 23—205 |
| 2,997,371 | 8/1961 | Wadsworth et al. | 23—205 |
| 3,012,859 | 12/1961 | Knight et al. | 23—205 |
| 3,143,402 | 8/1964 | Hervert et al. | 23—205 X |

OSCAR R. VERTIZ, Primary Examiner

G. ALVARO, Assistant Examiner

U.S. Cl. X.R.

55—71, 73